(12) United States Patent
Keller et al.

(10) Patent No.: US 7,065,127 B2
(45) Date of Patent: Jun. 20, 2006

(54) SYSTEM AND METHOD FOR GENERATING AND ACQUIRING PSEUDO-NOISE (PN) SPREAD SIGNALS

(75) Inventors: Merle L. Keller, Salt Lake City, UT (US); Vaughn L. Mower, Bountiful, UT (US); Kent R. Bruening, Sandy, UT (US)

(73) Assignee: L-3 Communications Systems, New York, NY (US)

( * ) Notice: Subject to any disclaimer, the term of this patent is extended or adjusted under 35 U.S.C. 154(b) by 804 days.

(21) Appl. No.: 10/058,669

(22) Filed: Jan. 28, 2002

(65) Prior Publication Data

US 2003/0142725 A1    Jul. 31, 2003

(51) Int. Cl.
 *H04B 1/69* (2006.01)
 *H04B 1/707* (2006.01)
(52) U.S. Cl. ...................... 375/140; 146/147
(58) Field of Classification Search ............... 375/130, 375/140, 142, 146, 147, 150, 151, 152, 153, 375/316, 343
See application file for complete search history.

(56) References Cited

U.S. PATENT DOCUMENTS

| | | | | |
|---|---|---|---|---|
| 3,665,472 A | * | 5/1972 | Kartchner et al. | 375/222 |
| 3,728,529 A | * | 4/1973 | Kartchner et al. | 708/250 |
| 4,225,935 A | * | 9/1980 | Zscheile et al. | 708/253 |
| 4,638,494 A | * | 1/1987 | Kartchner et al. | 375/367 |
| 4,776,012 A | * | 10/1988 | Zscheile et al. | 380/46 |
| 4,809,295 A | * | 2/1989 | Zscheile et al. | 375/142 |
| 5,022,049 A | * | 6/1991 | Abrahamson et al. | 375/130 |
| 5,598,154 A | | 1/1997 | Wilson et al. | 341/50 |
| 2003/0108085 A1 | * | 6/2003 | Keller et al. | 375/145 |
| 2003/0161383 A1 | * | 8/2003 | Mower et al. | 375/130 |
| 2004/0047401 A1 | * | 3/2004 | Keller et al. | 375/147 |

* cited by examiner

*Primary Examiner*—Kenneth Vanderpuye
*Assistant Examiner*—Jason M. Perilla
(74) *Attorney, Agent, or Firm*—Harrington & Smith, LLP

(57) ABSTRACT

A system for generating (PN) spread signals is provided. The system includes a first clock synchronized with a second clock and at least three first pseudo-noise (PN) component code generators coupled to the first clock. A logic combiner is coupled to the PN component code generators and is adapted to generate a composite PN code. Both clocks are coupled to respective N-bit and M-bit counters.

46 Claims, 12 Drawing Sheets

TSI LATENCY/UNCERTAINTY BUDGETS AND RELATED PN CODE ADJUSTMENTS

| PROCESS | WF A | | WF B | | WF C | | WF D | | WF E | | WF F | | WF G | | WF H | |
|---|---|---|---|---|---|---|---|---|---|---|---|---|---|---|---|---|
| 1) STATUS (MIN, MAX) MSEC | 9 | 9 | 9 | 9 | 9 | 9 | 9 | 9 | 9 | 9 | 9 | 9 | 9 | 9 | 9 | 9 |
| 2) BUS CYCLE TIME (MIN, MAX) MSEC | 0 | 130 | 0 | 130 | 0 | 130 | 0 | 130 | 0 | 130 | 0 | 130 | 0 | 130 | 0 | 130 |
| 3) STATUS DATA TABLE (MIN, MAX) MSEC | 0 | 57 | 0 | 57 | 0 | 57 | 0 | 57 | 0 | 57 | 0 | 57 | 0 | 57 | 0 | 57 |
| 4) SAMP_RATE, SCPC<br>a=893,353,198<br>b=1,108,674,225<br>c=1,165,482,325<br>d=1,342,320,446 | d,1 | | a,1 | | c,4 | | b,2 | | b,4 | | d,4 | | d,2 | | a,2 | |
| 5) LOCAL STATUS (MSEC), BUS CYCLE TIME LOCAL (MIN, MAX=0) | 9 | 70 | 9 | 70 | 9 | 70 | 9 | 70 | 9 | 70 | 9 | 70 | 9 | 70 | 9 | 70 |
| 6) GENERAL SOLUTION: SEARCH UNCERTAINTY, PN CODE ADVANCE MSEC | 225 | 225 | 225 | 225 | 191 | 297 | 225 | 225 | 225 | 225 | 225 | 225 | 225 | 225 | 225 | 225 |

FIG.6A

| FIG.6A |
|---|
| FIG.6B |

FIG.6

| A) SIO (MAX) MINIMUM=0 | 1248 b /25.03 Kb/s | 1248b /25.03 Kb/s | 1248b /10kb/s | 1248 /20kb/s | 1248 /20kb/s | 1248b /25.03 Kb/s | 1248b /25.03 Kb/s | 1248 b /25.03 Kb/s |
|---|---|---|---|---|---|---|---|---|
| B) INTERLEAVE & DEINTERLEAVE COMBINED TIMES m=0.2 | $2^{14}$ / 293Kb/s | $2^{14}$ / 390Kb/s | 512 / 15.9Kb/s | $2^{14}$ / 242Kb/s | $2^{14}$ / 242Kb/s | $2^{14}$ / 293Kb/s | $2^{14}$ / 293Kb/s | $2^{14}$ / 390Kb/s |
| B) INTERLEAVE & DEINTERLEAVE COMBINED TIMES m=1 | $2^{16-1}$ / 293Kb/s | $2^{16-1}$ / 390Kb/s | | $2^{16-1}$ / 242Kb/s | $2^{16-1}$ / 242Kb/s | $2^{16-1}$ / 293Kb/s | $2^{16-1}$ / 293Kb/s | $2^{16-1}$ / 390Kb/s |
| B) INTERLEAVE & DEINTERLEAVE COMBINED TIMES m=3 | $2^{16-3}$ / 293Kb/s | $2^{16-3}$ / 390Kb/s | | $2^{16-3}$ / 242Kb/s | $2^{16-3}$ / 242Kb/s | $2^{16-3}$ / 293Kb/s | $2^{16-3}$ / 293Kb/s | $2^{16-3}$ / 390Kb/s |

FIG.6B

SYSTEM AND METHOD FOR GENERATING AND ACQUIRING PSEUDO-NOISE (PN) SPREAD SIGNALS

BACKGROUND OF THE INVENTION

1. Field of the Invention

The present invention relates to spread spectrum communication systems using PN coding techniques and, more particularly, to acquiring PN code phase.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code maximum chip rate, which in turn may be an integer multiple of the symbol rate $R_S$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

As noted, the DSSS system PN-code sequence spreads the data signal over the available bandwidth such that the signal appears to be noise-like and random; but the signal is deterministic to a receiver applying the same PN-code to de-spread the signal. However, the receiver must also apply the same PN-code at the appropriate phase in order to de-spread the incoming signal, which explicitly implies synchronization between the receiver and transmitter. However, in group communication environments, such as a fleet battle-group where the battle-group composition changes regularly (daily or even hourly); or where the participants are engaged in a common training exercise, but geographically dispersed around the globe, typical synchronization techniques, such as resetting the start of the PN code for all the participants, is not practical. Moreover, communication interruptions due to resetting PN codes at an arbitrary time seam, such as days, weeks, months, and years, in a battle-group environment could have undesirable consequences. As used herein, a time seam occurs when a fleet of platforms begins its PN code from the beginning of a time event, such as the Global Positioning System (GPS) day in which the fleet assembles. The convention used by the fleet is to ignore subsequent GPS day boundaries once communication among the fleet has begun, meaning that the PN code shared among the fleet is not reset at subsequent GPS day boundaries.

In this manner, fleet communications can persist for two or three days. However, a platform that attempts to join the fleet and participate in fleet communications, subsequent to the beginning of the time event is confronted with a time and PN code phase ambiguity and will be unable to join fleet communications.

Some systems may use three-component PN codes where acquisition is often achieved by searching each component code for phase alignment with the PN-encoded signal one chip at a time. This means that each chip of a component code must be searched in order to discover its phase alignment with the PN code. Although a common practice with many three-component codes, this brute force approach is time consuming. In addition, this approach is impractical with MANDed or certain combinations of four-subcomponent (x,y,z1,z2) PN codes, discussed herein, since the number of chips is $x+y+(z_1 \times z_2)$ as opposed to a logic xor combination such as $x+y+z_1+z_2$. Thus, a brute force, chip-by-chip acquisition approach becomes prohibitive because of the very large number of chips to search. It is therefore desirable to provide a method and system whereby platforms (communication systems) may join fleet communications at any time with unambiguous time and PN code phase alignment.

SUMMARY OF THE INVENTION

The foregoing and other problems are overcome, and other advantages are realized, in accordance with the presently preferred embodiments of these teachings.

In accordance with one embodiment of the present invention, a system for generating and acquiring pseudo-noise (PN) spread signals is provided. The system includes a transmitter, having a first clock and at least three first pseudo-noise (PN) component code generators coupled to the first clock. The transmitter also includes a logic combiner coupled to the PN component code generators and is adapted to generate a composite PN code. A second clock is mathematically slaved with the first clock while both clocks are coupled to respective N-bit counters. The system also includes a receiver adapted to receive partially correlated signals from the transmitter, and includes a link control processor and a modulator/demodulator controller coupled to the link control processor. The receiver also includes a first receiver clock and at least three first receiver pseudo-noise (PN) component code generators coupled to the first receiver clock. In addition, the receiver includes a despreader coupled to one of the receiver PN component code generators and a receiver logic combiner coupled to the receiver PN component code generators. The receiver logic combiner is adapted to generate the composite PN code. A second receiver clock is adapted to synchronize with the receiver first clock and both are coupled to N- and P-bit counters, respectively.

In accordance with another embodiment of the invention, a method for generating and acquiring pseudo-noise (PN) composite spread signals is provided. The method includes the steps of providing a PN clock source having a predetermined cycle rate and using the PN clock source to generate at least three PN component codes. Generating the PN component codes further includes the step of initializing a counter adapted to count the PN clock source cycles. The PN component codes are logically combined to produce a PN composite code. The next steps provide an oscillatory reference source also with predetermined cycles and initializing a second counter adapted to count the cycles of the oscillatory reference source. The method also includes the step of determining a transmitter delta phase in accordance with counts from the first counter and the second counter. The transmitter delta phase and the second counter count are PN composite encoded and transmitted at a predetermined rate, e.g., frame rate. At a receiver, the transmitted signal is partially correlated, from which recovered data a PN composite code slip for chip aligning a receiver PN composite code with the transmitter PN composite code is determined.

In accordance with another embodiment of the invention, a system for generating (PN) spread signals is provided. The system includes a first clock and at least three pseudo-noise (PN) component code generators coupled to the first clock. A logic combiner coupled to the PN component code generators is adapted to generate a composite PN code. In addition, a second clock is adapted to synchronize with the first clock, and both clocks are coupled to respective binary counters.

In accordance with another embodiment of the invention, an integrated circuit (IC) is provided. The integrated circuit includes a first clock and at least three first pseudo-noise (PN) component code generators coupled to the first clock. In addition, the IC includes a logic combiner coupled to PN component code generators, and the logic combiner is adapted to generate a composite PN code. The IC also includes a second clock adapted to synchronize with the first clock, and both clocks are coupled to respective N-bit counters.

The invention is also directed towards a program storage device readable by a machine, tangibly embodying a program of instructions executable by the machine to perform method steps for generating and acquiring pseudo-noise (PN) composite spread signals. The method includes the steps of providing a PN clock source having a predetermined cycle rate and using the PN clock source to generate at least three PN component codes which are logically combined to produce a PN composite code. The method also includes initializing a first counter adapted to count the PN clock source cycles and providing an oscillatory reference source, the oscillatory reference source also having predetermined cycles. A second counter is adapted to count the cycles of the oscillatory reference source. The next step determines a transmitter delta phase in accordance with counts from the first counter and the second counter and PN composite encodes and transmits the transmitter delta phase and the second counter count at a predetermined rate, e.g., frame rate. At a receiver, the transmitted signal is partially correlated, and a PN composite code slip for chip aligning the receiver PN composite code with the transmitter PN composite code is determined.

BRIEF DESCRIPTION OF THE DRAWINGS

The foregoing aspects and other features of the present invention are explained in the following description, taken in connection with the accompanying drawings, wherein:

FIG. 6 is a table illustrating time delay between requesting and receiving TSI for several representative waveforms;

DETAILED DESCRIPTION OF THE PREFERRED EMBODIMENT

As disclosed herein, the present invention describes a novel method and system for PN code phase coordination and alignment of direct sequence spread spectrum signals.

Figure 1A:
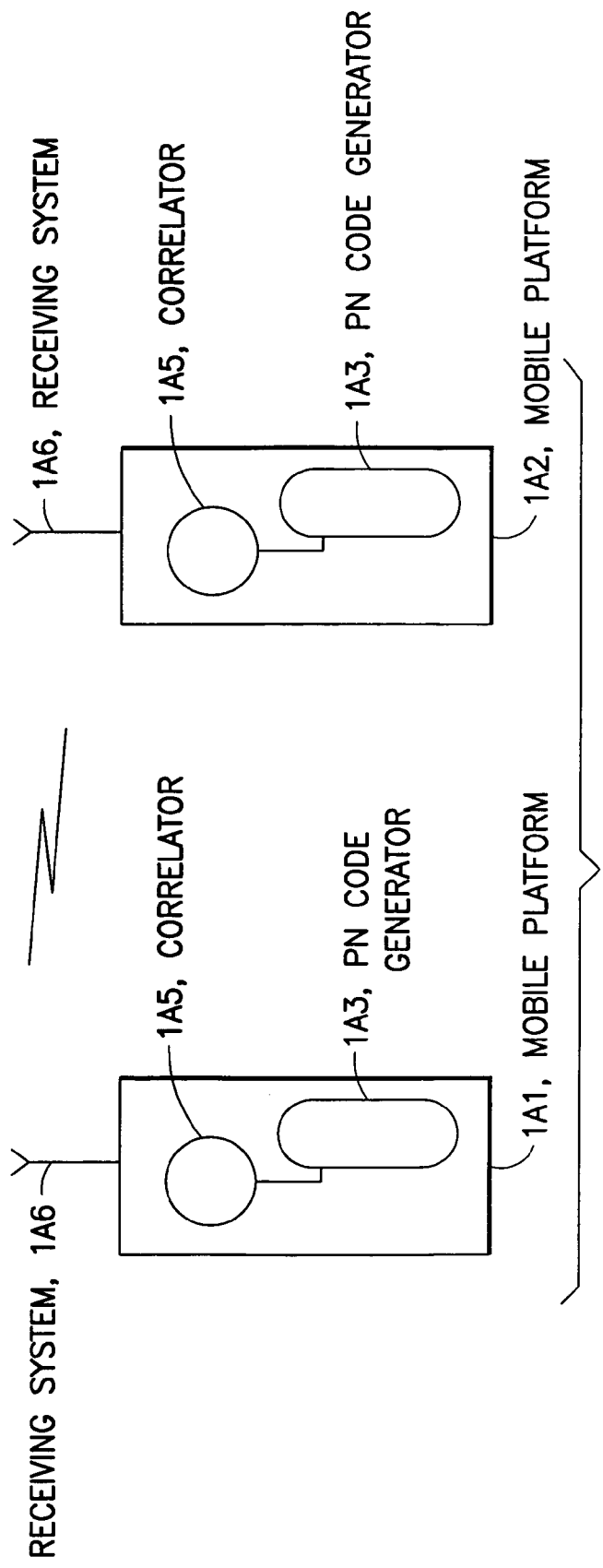
FIG. 1A is a pictorial diagram of a communication system having a transceiver and PN code generator incorporating features of the present invention.
Figure 1B:
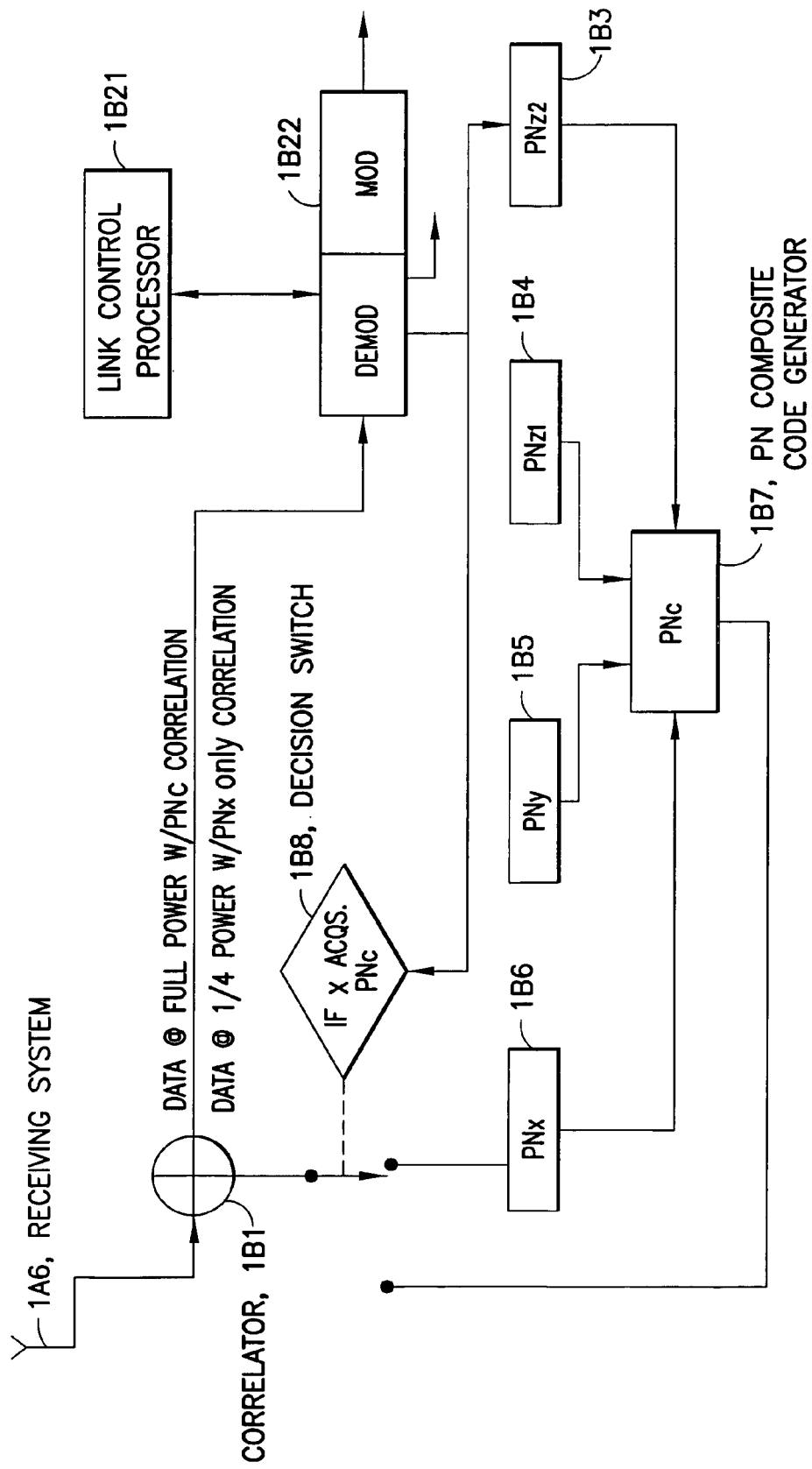
FIG. 1B is a block diagram of the receiver shown in FIG. 1A.

Referring to FIG. 1A, there is shown a pictorial diagram of a communication system having a transceiver and PN code generator incorporating features of the present invention. Referring also to FIG. 1B, there is shown a block diagram of the receiver shown in FIG. 1. Although the present invention will be described with reference to the embodiments and examples shown in the drawings, it should be understood that the present invention could be embodied in many alternate forms of embodiments. For example, it should be appreciated that the teachings herein may be applied to any group or assembly of spread spectrum (SS) receivers, including those that are fixed in place; vehicle mounted; and/or hand carried.

As shown in FIG. 1A, each mobile platform 1A1, 1A2, contains a correlator 1A5 and a PN code generator 1A3. Correlator 1A5 includes, as shown in FIG. 1B, a receiving system 1A6, a correlator 1B1, a link control processor (LCP) 1B21, and modulator/demodulator controller 1B22, PN subcomponent generators, 1B3–1B6, PN composite code generator 1B7 and a decision switch 1B8. In the preferred embodiment, a PN composite code generator generates a PN composite code according to logic arrangement shown in FIG. 2. It will be appreciated that PN code generator 1A3 could be used in place of PN subcomponent generators, 1B3–1B6, and $PN_c$ composite code generator 1B7. However, for illustration and clarity, the block diagram is presented as shown but is not intended to be limited to this particular configuration. Still referring to FIG. 1, the demodulator 1B22 tests for X-code acquisition. When it has found X-code phase, its bus data controller alerts LCP 1B21. LCP 1B21 uses remote and local PN code phase data to calculate a slip command to demodulator 1B22. LCP 1B21 commands demodulator 1B22 slip to center of uncertainty; demodulator 1B22 then slips $PN_c$ 1B7 through uncertainty in $L_x$ steps.

Figure 2:
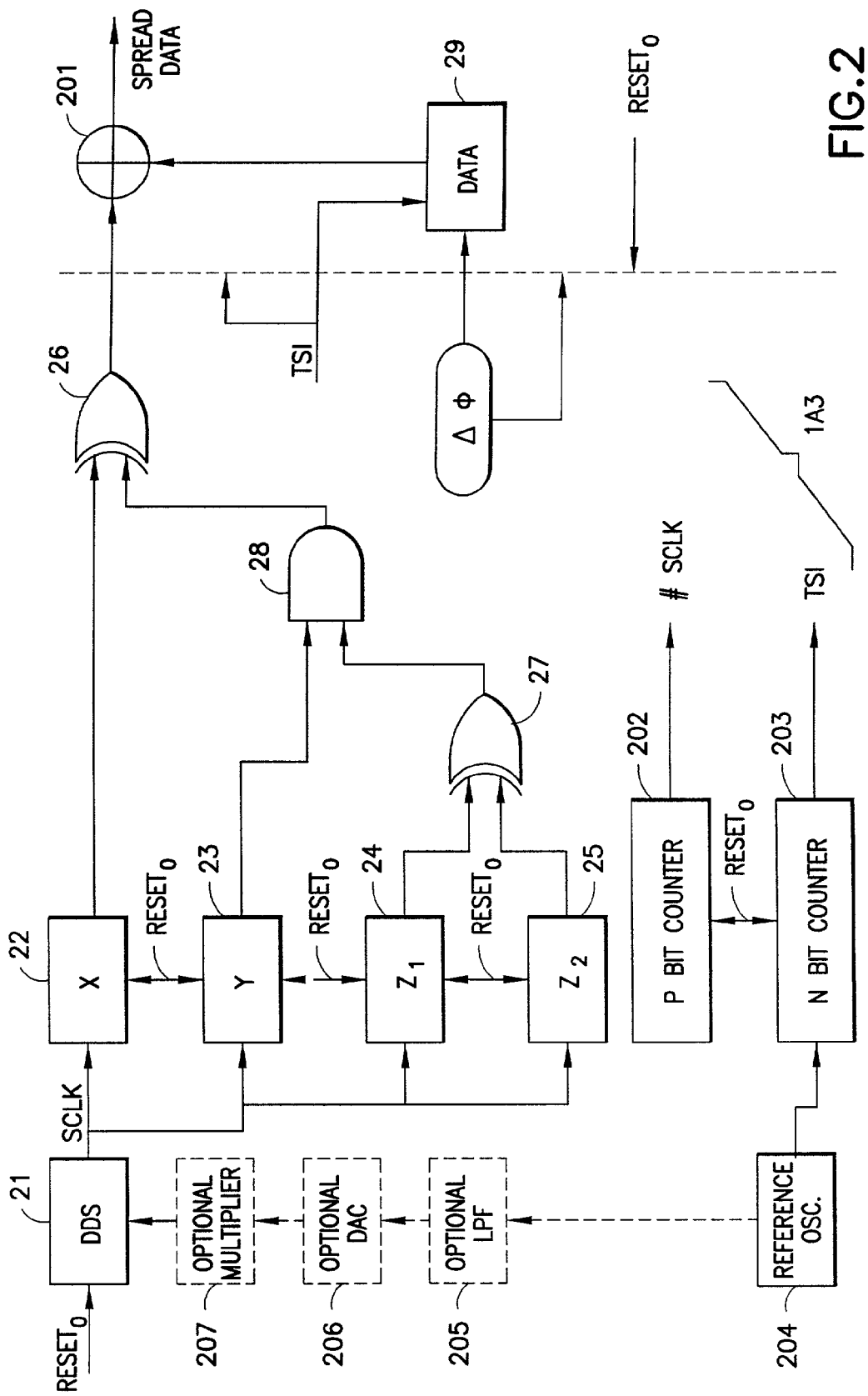
FIG. 2 is a block diagram of the master PN code generator shown in FIG. 1 incorporating features of the present invention.
Figure 5:
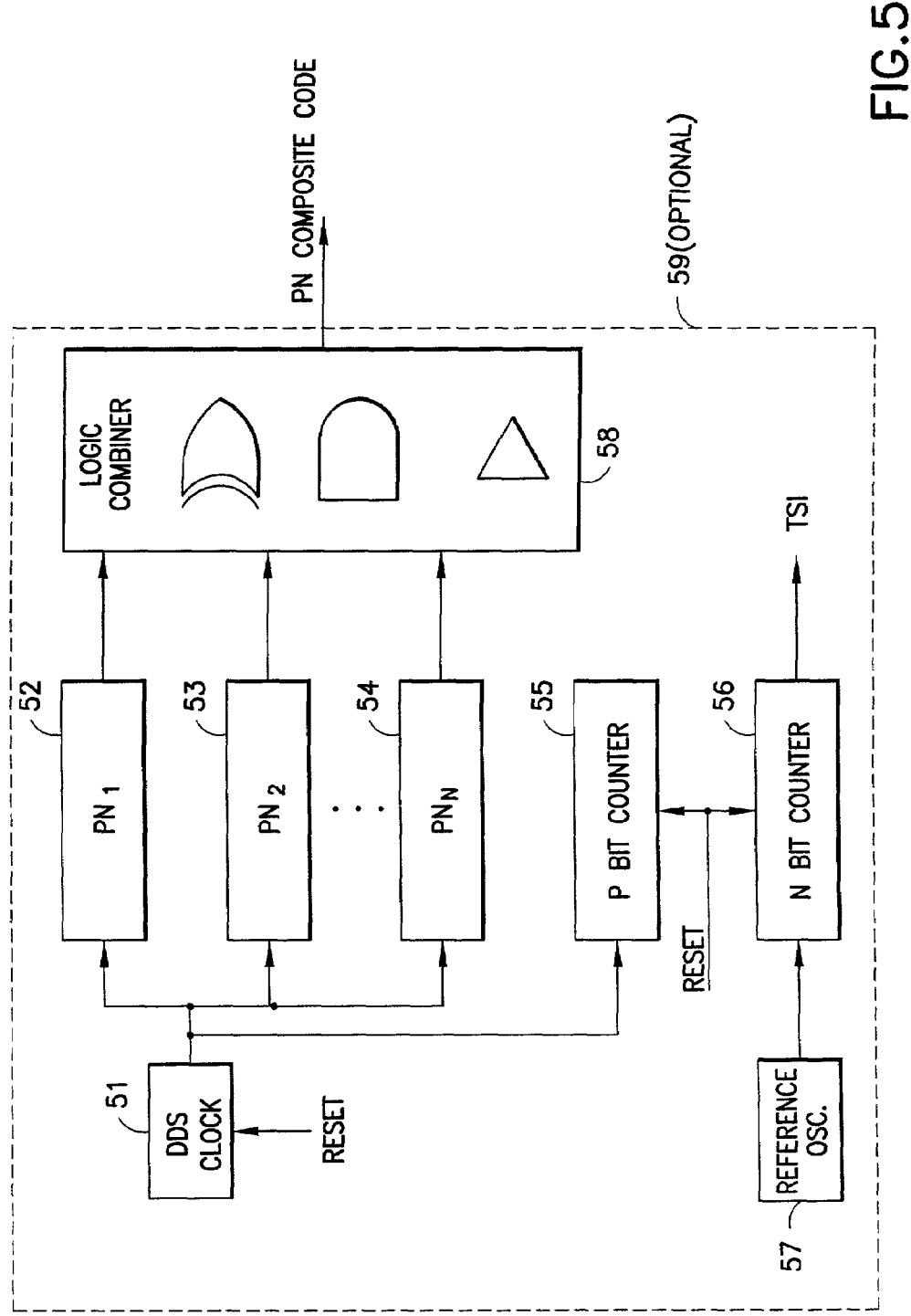
FIG. 5 is a block diagram of an alternative PN code generator incorporating features of the present invention.

In the preferred embodiment, the PN composite code is a PN decade-code and is constructed with four subcomponent PN codes logically combined as shown in FIG. 2. However, in alternate embodiments, any suitable number of subcomponent PN codes may be logically combined (FIG. 5). The PN decade-code, once started, spans a predetermined time span before repeating. In a preferred, but not limiting embodiment, the time span is on the order of years. In general the number of years is measured in decades.

As will be made clear, a data signal 29 (FIG. 2) that is spread by a PN decade-code constructed of four sub-component PN codes in accordance with the teachings of the invention can be despread and initially acquired by a receiver without full correlation of the entire PN spreading code.

Referring still to FIG. 2, in the preferred, but not limiting, embodiment, a spreading and despreading PN code is constructed of four subcomponent PN codes by PN subcomponent PN code generators 22–25. The outputs of the subcomponent PN code generators are MAND combined ($X \oplus (Y$ AND $(Z_1 \oplus Z_2))$), by logic devices 26, 27, and 28. In the preferred embodiment, the PN decade-code is designed to be substantially orthogonal with other PN codes. Also, in the preferred embodiment, one of the PN codes to the left of the AND in the MAND code is assigned to be an even-length code with special auto correlation properties. In alternate embodiments, any suitable number of component codes could be assigned to be a suitable length with suitable autocorrelation properties. For example, in alternate embodiments a suitable length code could be an odd maximal length code. In addition, a MAND composite code composed of four component codes in accordance with the teachings of the invention has partial correlation properties with its X, Y, and/or $(Z_1 \oplus Z_2)$ component codes. For example, when a MAND code is mixed (or correlated) by a receiver (FIG. 1B) with an exact copy of its X code and the X code is aligned (in phase) with the MAND code, the MAND PN encoded data is recovered, albeit the recovered signal has ¼ the power than if full correlation were achieved. Thus, by acquiring an even-length code first, in accordance with, but not limited to the teachings of the invention, symbol synchronization [of even or odd length] can be achieved independent of symbol synchronizers, and a partial correlation allows the recovery of encoded data from the received signal.

Acquisition of the four-component MAND PN code (PN decade-code) is accomplished by determining a PN code delta phase and time since initialization (TSI) of the transmitting and receiving PN decade-codes.

Figure 4:
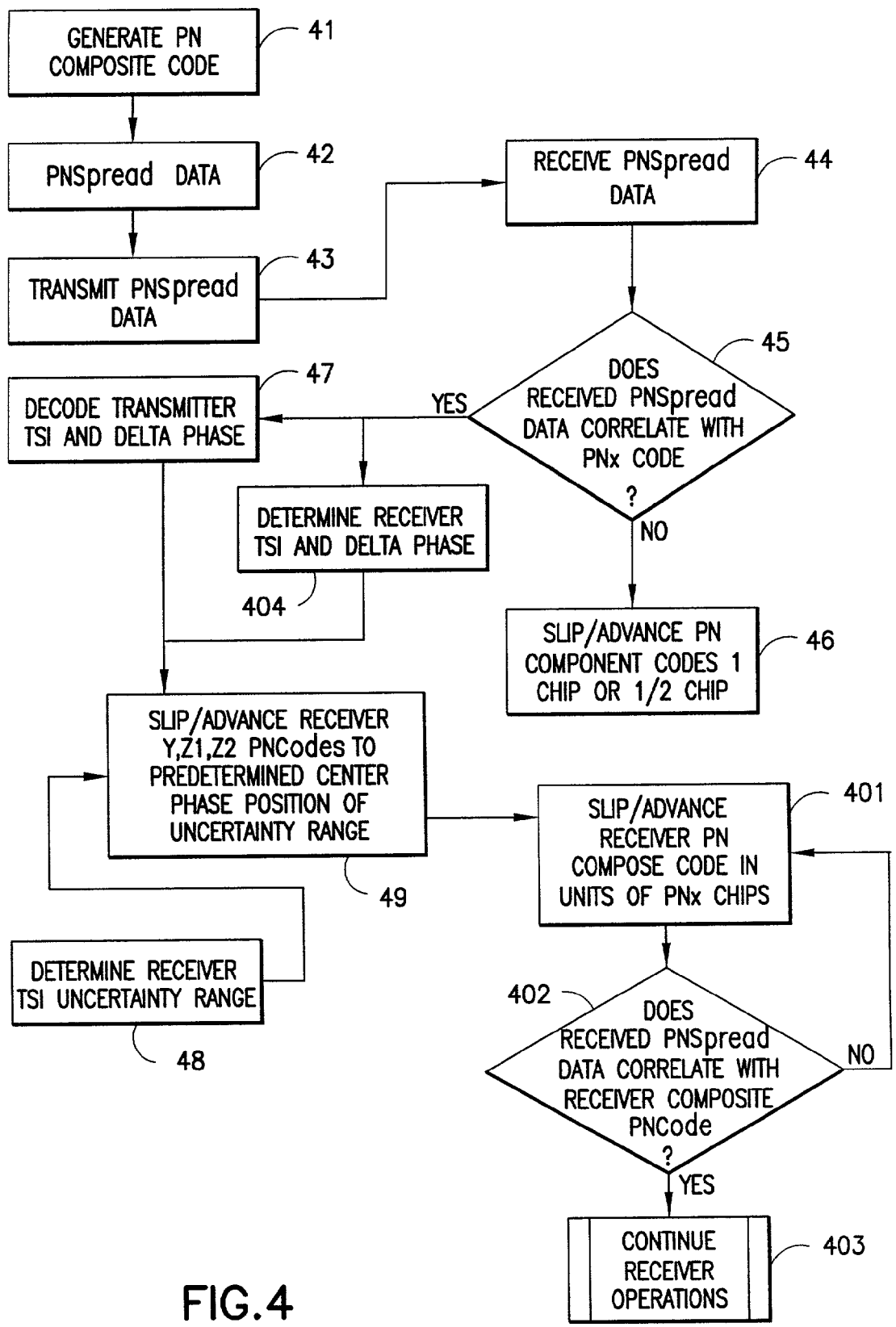
FIG. 4 is a method flow chart showing steps for one method implementing features of the present invention shown in FIGS. 1A and 1B.

Referring also to FIG. 4, partial or x-code acquisition begins with receiving a data signal spread by the PN decade code, step 44. The PN spread data signal is correlated with the X-component code, chip-by-chip until the X-code partially correlates with the MAND PN coded signal. In the preferred embodiment, the x-component code is used for partial correlation. However, in alternate embodiments any suitable component code could be used. Correlation techniques are well known and need not be discussed here other than to note that when the X code is slipped one or ½ chip, the Y, $Z_1$, and $Z_2$ component codes are slipped equally, step 46. In this manner, the entire composite code is slipped by one chip, preserving knowledge of the MAND PN component code phase.

Step 47 decodes the transmitter TSI and Delta phase, and steps 48, 49, and 401 determine an uncertainty range due to receiver TSI and slips or advances the MAND PN code in units of the PNx subcomponent code. It will be appreciated that time latencies associated with receiver TSI (FIG. 6) and associated chip latencies may be predetermined and stored or determined as needed.

Steps 47–49 and 401 may be further explained by also referring FIG. 2, where it will be appreciated that each platform has an accurate method of keeping time since TSI of its respective PN generator in accordance with the teachings of the invention. In the preferred embodiment of the present invention each participating platform has a sampling clock 21 operating at rate $R_{SC}$ sampling clocks per second (Sclk) and drives MAND PN code generation. In the preferred embodiment, the source of the sampling clock is a direct digital synthesizer (DDS) 21, and the DDS 21 generates its Sclk based on a digital seed word instruction. For explanation purposes, the digital seed word may be referred to as samp_rate, with units of DDS LSb's (Least Significant bits).

In the preferred embodiment, each modulator (transmitting platform) and correlator (receiving platform) has a sampling-clock counter 202, and each platform has its own reference clock 204, a 10 MHz reference oscillator, for example, and its own TSI counter 203. In the preferred embodiment, the TSI counter 203 is a 40-bit counter (or a counter of a number of bits that counts an unambiguous length of time-longer than the duration of the intended communication) that counts every cycle of a preferred 10 MHz reference oscillator. In alternate embodiments, the TSI counter 203 may be any suitable bit length counter, and the reference oscillator 204 may be any suitable reference oscillator. In addition, the reference oscillator 204 may be synthesized with the DDS and associated filters and multipliers 205–207 or a separate dedicated DDS. As part of the initialization routine, sampling clock counter 202, TSI counter 203, PN generators 22–25, and DDS 21 are set or reset to zero by reset signal $RESET_0$. At this point, zero sampling clocks have been counted, zero reference clock cycles have been counted, and the PN code is at the beginning of its sequence (PN code phase equals zero). The relationship between samp_rate (DDS LSb's) and sampling rate (Hz) may be expressed as:

$$\text{samp\_rate} = \frac{R_C \times \text{Sampling Clocks Per Chip} \times 2^{32}}{16 \times 6 \times (\text{"10 MHz" Reference Oscillator})} \qquad \text{Equation 1}$$

In equation 1, the DDS sampling rate is expressed as the chipping rate ($R_C$) times the number of sampling clocks per chip (SCPC). The terms $2^{32}/16/6/10$ MHz are shown as an example of how a digital synthesizer and frequency source can exploit a 10 MHz reference oscillator and multipliers and dividers in order to achieve a preferred chipping rate, and are not limiting. In alternate embodiments any suitable number and types of multipliers and dividers may be used. If the sampling rate were 100 MHz and if there were two cycles of the sampling clock per one chip (SCPC=2), the chipping rate would be 50 Mc/s. For clarity, the values used in equation 1 can be reduced to a simpler form that is accurate only to the precision of an example 10 MHz reference oscillator:

$$\text{samp\_rate} \cong R_C \times \frac{2^{20}}{3 \times 5^7} \times SCPC \qquad \text{Equation 2}$$

Figure 3:
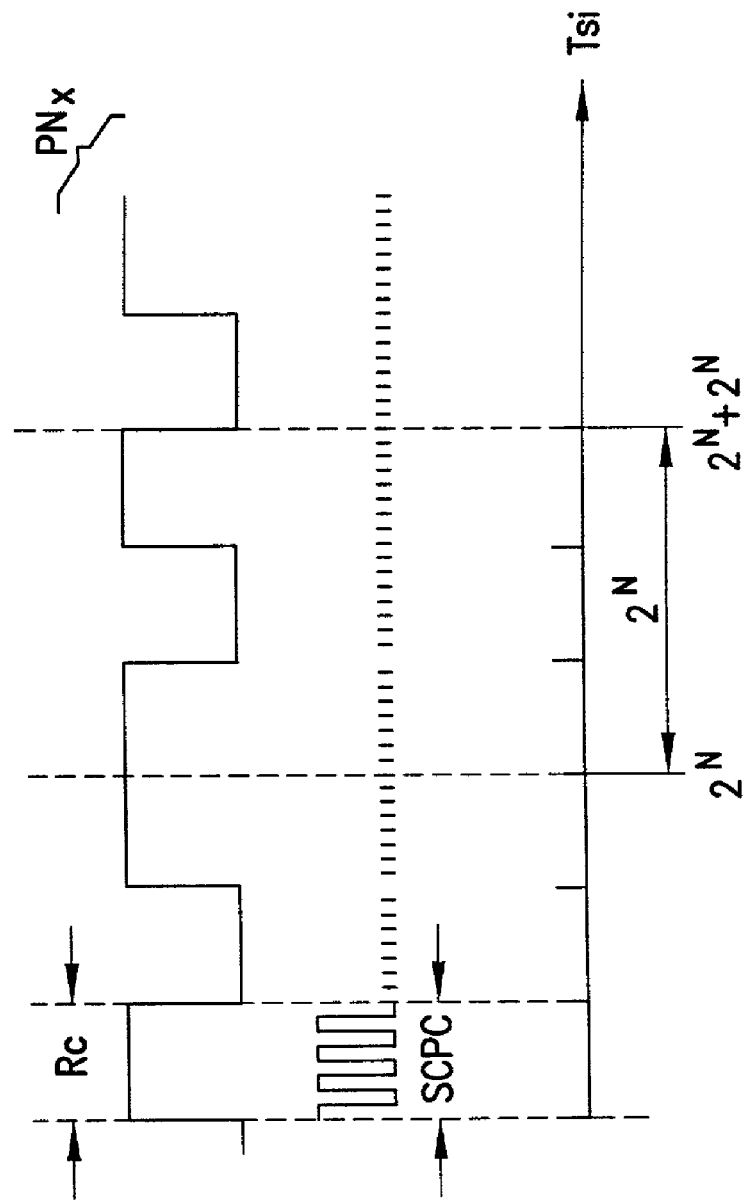
FIGS. 3A–3C is a pictorial representation showing one relationship between PN code chips, sample clocks per PN code chip, and elapsed time since PN initialization, respectively.

Referring also to FIGS. 3A–3B, there is shown a sample relationship between chip rate Rc, sample clocks per chip SCPC, and TSI units. In the above 10 MHz reference example, a relationship between TSI and samp_rate may be defined as:

$$TSI_{\to Chips} = TSI(25.6 \, \mu sLSB_s) \times \qquad \text{Equation 3}$$

$$\frac{2^8}{"10 \text{ MHz}"} \times \frac{\text{samp\_rate} \times 16 \times 6 \times "10 \text{ MHz}"}{SCPC \times 2^{32}}$$

Thus converting a unit TSI to its equivalent number of chips, where, in this example, one TSI of a predetermined unit of 25.6 μs ($2^8 \times 0.1$ μs cycles for a 10 MHz reference) is selected.

Which reduces to:

$$TSI\_25.6 \mu s_{\to Chips} = TSI\_25.6 \mu s \times \frac{\text{samp\_rate}}{SCPC} \times \frac{3}{2^{19}} \quad \text{Equation 4}$$

Equation 4 calculates the number of free-running chips that occurs within a TSI (with 25.6 μs LSb), where free running refers to the nominal samp_rate, and no Doppler, dither, clock correction, or intentional PN slips or advances are taken into consideration. In alternate embodiments, the TSI units can be any suitable units.

When DDS LSb's are added to or subtracted from a nominal samp_rate, the sampling clock rate increases or decreases, respectively, and accumulated delta phase ($\Delta\Sigma\theta$) results; this may occur with Doppler, dither, and clock correction. The symbol used for accumulated phase utilizes the Greek letters delta and theta ($\Delta\theta$), meaning difference in phase, and sigma ($\Sigma$), which is commonly used to represent accumulation, addition, or integration. Accumulated delta phase may be represented as follows:

$$\frac{\# SCLK}{SCPC} = TSI_{\to Chips} + \Delta\sum\theta \quad \text{Equation 5}$$

Equation 5 indicates that the number of sampling clocks (in terms of chips) counted from initialization is equal to the number of free-running sampling clocks that would have occurred during the stipulated TSI had only the nominal samp_rate been used plus the number of chips that occurred as a consequence of Doppler, dither, clock correction (any reason for which the samp_rate could have been increased or decreased). Intentional PN slips or advances may be denoted by $\Delta\theta_{XYZ1Z2}$, meaning that an intentional PN slip or advance is a delta phase (a deviation from the free-running, nominal PN code phase), and $XYZ_1Z_2$ indicates that composite code phase is involved (X, Y, Z1, and $Z_2$ component code phases experience the identical phase shift). It can be seen that delta phase consists of component code phase plus accumulated phase, as follows:

$$\Delta\theta_{PN} = \Delta\Sigma\theta + \Delta\theta_{XYZ_1Z_2} \quad \text{Equation 6}$$

Equation 6 shows that delta phase consists of accumulated delta phase and component code delta phase. Positive delta phase represents a composite code phase advance, and a negative delta phase represents a composite code phase slip.

Equation 7, illustrates a time and phase relationship of the parameters that are used to determine composite code phase:

$$\theta_{PN} = \#SCLK_{\to Chips} + \Delta\theta_{XYZ_1Z_2} = TSI_{\to Chips} + \Delta\theta_{PN} = TSI_{\to Chips} + \Delta\theta_{XYZ_1Z_2} + \Delta\Sigma\theta \quad \text{Equation 7}$$

Equation 7 shows that a PN code's composite phase is equal to the actual number of sampling clocks (whether they occurred at the nominal sampling rate or not, converted into chips) plus any intentional slips or advances (in chips), which equation is the same as time since initialization (converted into chips) plus delta phase (item 210 in FIG. 2) (in units of chips), which is substantially the same as time since initialization (converted into chips) plus component code delta phase and accumulated delta phase (both in units of chips). TSI and delta phase data are gathered at the same time. Stated differently, Equation 7 indicates that the PN composite code phase ($\theta_{PN}$), the actual chip position within the entire PN code sequence from $XYZ_1Z_2$ epoch to $XYZ_1Z_2$ epoch, is equal to the number of free-running chips ($TSI_{\to Chips}$, TSI converted into chips) plus delta phase ($\Delta\theta_{PN}$), where TSI is an actual measure of reference oscillator clock cycles. Thus, determining a transmitting platform's composite code phase and a receiving platform's composite code phase, the receiving platform can calculate the phase difference between the two composite code phases and determine the amount by which the receiving platforms composite code phase needs to be slipped or advanced in order for its local MAND PN code to be in phase agreement with the transmitting platform's MAND PN code.

At this point in the acquisition, the receiving platform's correlator X code is in phase alignment with the received MAND PN code sequence. However, X-code-only alignment is a partial correlation; Y, $Z_1$, and $Z_2$ codes have not been aligned, and the correlated portion of the signal is substantially ¼ of the of the transmitted signal power. In order to achieve full correlation and full power, and full power the receiving platform aligns its Y, $Z_1$, and $Z_2$ codes (in addition to the X code) with the received PN sequence by slipping or advancing its Y, $Z_1$, and $Z_2$ component codes to the composite code phase of the received PN sequence.

The receiving platform then calculates the difference between its correlator PN code phase and the transmitting platform's reported modulator PN code phase (based on Equation 7) as follows:

$$PN\_Code\_Advance\_Corr\_Chips = \theta\_PN\_Modulator - \theta\_PN\_Correlator \quad \text{Equation 8}$$

$$\Delta\theta_{Corr} = TSI_{\to Chips}\_Mod + \Delta\theta\_PN\_Mod - \{TSI_{\to Chips}\_Corr + \Delta\theta\_PN\_Corr\} \quad \text{Equation 9}$$

$$\Delta\theta_{Corr} = TSI_{25.6\mu s\_Mod} \times \frac{\text{samp\_rate}}{SCPC} \times \frac{3}{2^{19}} - TSI_{25.6\mu s\_Corr} \times \frac{\text{samp\_rate}}{SCPC} \times \frac{3}{2^{19}} + \frac{\Delta\theta_{PN\_Mod}}{SCPC} - \frac{\Delta\theta_{PN\_Corr}}{SCPC} \quad \text{Equation 10}$$

Equation 8 and Equation 9 conceptually express the PN code phase advance needed by a receiving platform's correlator. Equation 10 is the form of the equation to be used by a receiving platform's Link Control Processor (LCP) 1B21.

A Modulator/Demodulator Controller (MDC, the microprocessor that controls PN generators, item 1B22 in FIG. 1B) provides as status, in this example, possibly two versions of delta phase, either version of which may be used in Equation 10. One version, placed in close frame proximity to an instantaneous TSI, is the most current delta phase information, and is intended for acquisition purposes. The other version made available (tagged) once per XY epoch, is intended for range equation use, and can be chip latent on the order of 600 chips more latent than the most-current delta phase, for the example case being considered.

Relative to uncertainties being searched, a 600-chip latency is very small, allowing either version of delta phase to be used. Although it will be appreciated that either version of TSI may be used, instantaneous TSI is preferably used in Equation 10. TSI captured once per XY epoch (Tagged TSI)

is potentially far too latent to be of any use for data-aided acquisition. The phase advance result of Equation 10 plus the result of Equation 14 is sent by the LCP 1B21 to the Modulator/Demodulator Controller (MDC) 1B22 by means of an operation command; phase advance then positions the receiving platform's correlator code to the center of the uncertainty to be searched. Y, $Z_1$, and $Z_2$ are also moved to the center of zero-phase uncertainty, step 49.

While the MDC 1B22 is in a data-aided acquisition wait state, waiting for its LCP 1B21 to command it to perform the necessary PN code phase slip on its receive PN code, the LCP calculates and sends an RX Slip every time it passes through an executive Loop (approximately 57 ms, as an example). The MDC 1B22 keeps the most recent RX Slip value on erasable memory that may be overwritten with the most current slip value and may be purged upon entering any state that uses/consumes the RX Slip value.

In alternate embodiments, premature use of Equation 10 for a present search may result in PN code phase search in an inappropriate region of the composite code. Consequently, when the MDC 1B22 is in its data-aided search state (searching the area of PN code uncertainty that its LCP commanded it to search), the LCP 1B21 may perform an RX slip overseer function; in other words, the LCP 1B21 may calculate and command RX slips, subsequent to an initial slip, if a predetermined condition is met; for example, if the following condition is met: 1×Equation 14<Equation 10<−3×Equation 14, where Equation 14 represents the general solution, chip uncertainty being searched.

An RX slip (Equation 10) has been calculated, the result of Equation 14 has been added to it, the slip command (sum of the two) has been sent to the MDC 1B22, and the slip has been performed by the MDC 1B22. The zero phase position being sought should fall within the uncertainty being searched, step 48. Subsequent solutions to Equation 10 that are less than +1 times and more positive than −3 times the magnitude of Equation 14 preferably fall within the range of solutions that agrees with the current phase position of the receiver PN code. Solutions to Equation 10 that fall beyond this range may indicate that the receiver PN code phase position is in error, perhaps the result of inappropriate data, and a new slip command, based on the most current data, should be sent to the MDC 1B22.

Continuing, the MDC 1B22 preferably does not move its Y, $Z_1$, and $Z_2$ component codes by the exact number of chips commanded by the LCP 1B21. It is desired that the MDC move its correlator PN code by a number of chips that results in its X code having the same phase as it has prior to the move, since the X-code is already partially correlated (in phase agreement) with the received signal. As noted above, Y, $Z_1$, and $Z_2$ codes have been slipped with X, chip for chip. Therefore, each time X is slipped one chip, Y, $Z_1$, and $Z_2$ are each slipped one chip, and $\Delta\theta_{XYZ1Z2}$ is decremented by one. Moving component codes Y, $Z_1$, and $Z_2$ the same amounts preserves composite code phase, as expressed in Equation 7. Preferably, the MDC 1B22 checks that Y, $Z_1$, and $Z_2$ component codes are moved a modulo X-length number of chips, thus maintaining X-code phase and moving to the nearest modulo X-code position commanded by the LCP.) By using Equation 11, the MDC 1B22 insures that it moves its PN code by modulo X code length.

$$\Delta\theta_{Corr} = \Delta\theta_{Corr} - (\Delta\theta_{Corr} \bmod L_X) \quad \text{Equation 11}$$

Equation 10 calculates the PN code advance required to bring a receiver's locally generated PN code into phase agreement with the received PN code, based on TSI and delta phase information gathered locally and from the opposing platform. However, local and remote TSIs used in an LCP's calculation of Equation 10 are latent. The average time delay of TSI latency must be added (to the result of Equation 10) in order to advance the receiver's PN code position to the center of the uncertainty to be searched, and the one-sided uncertainty to be searched is half the distance between the maximum and minimum TSI delay. After a TSI arrives, the LCP must access it and compare it to its own TSI, using Equation 10. However, the receiving platform's TSI has to be gathered by the LCP 1B21 from the MDC 1B22, giving the receiving platform's TSI some latency by the time it is compared against the transmitting platform's TSI. Example budgets for TSI latency are shown in FIG. 6.

One example process (item) 5, referenced FIG. 6, deals with the "local" effort of getting TSI from the local MDC to the LCP: 9 ms for status and 0 to 70 ms for bus cycle time. TSI latency may be calculated in terms of PN code advance and uncertainty as follows:

Search Uncertainity $$\text{Search Uncertainty} = \frac{1x - 1n + 2x - 2n + 3x - 3n + Ax - An + 5lbct}{2} \quad \text{Equation 12}$$

$$PN \text{ Code Advance} = \frac{1x + 1n + 2x + 2n + 3x + 3n + 3(Ax) + An + 2(B \text{ or } C \text{ or } D) - 2(5ls) - 5lbct}{2} \quad \text{Equation 13}$$

Equation 12 and Equation 13, x refers to maximum, and n refers to minimum. For example, 2x refers to the maximum value of line 2, which for Waveform A is 130 ms. Ax refers to the maximum value of equation A (line A of FIG. 6). 5ls refers to line 5, Local Status, and 5lbct refers to line 5, Local Bus Cycle Time.

Figures 7, 7A:
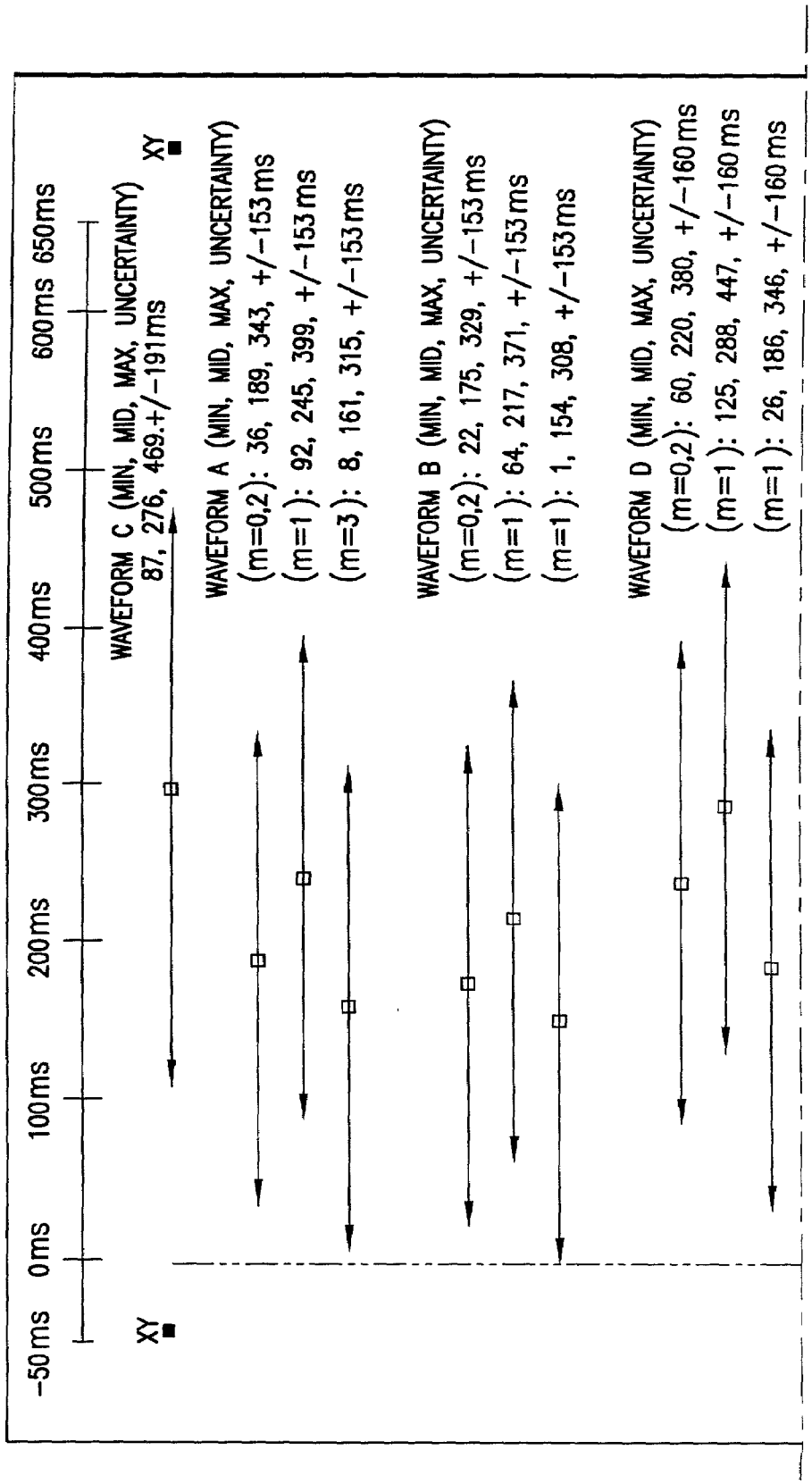
FIG. 7 is a time graph representing the uncertainties of the representative waveforms shown in FIG. 6.
Figure 7B:
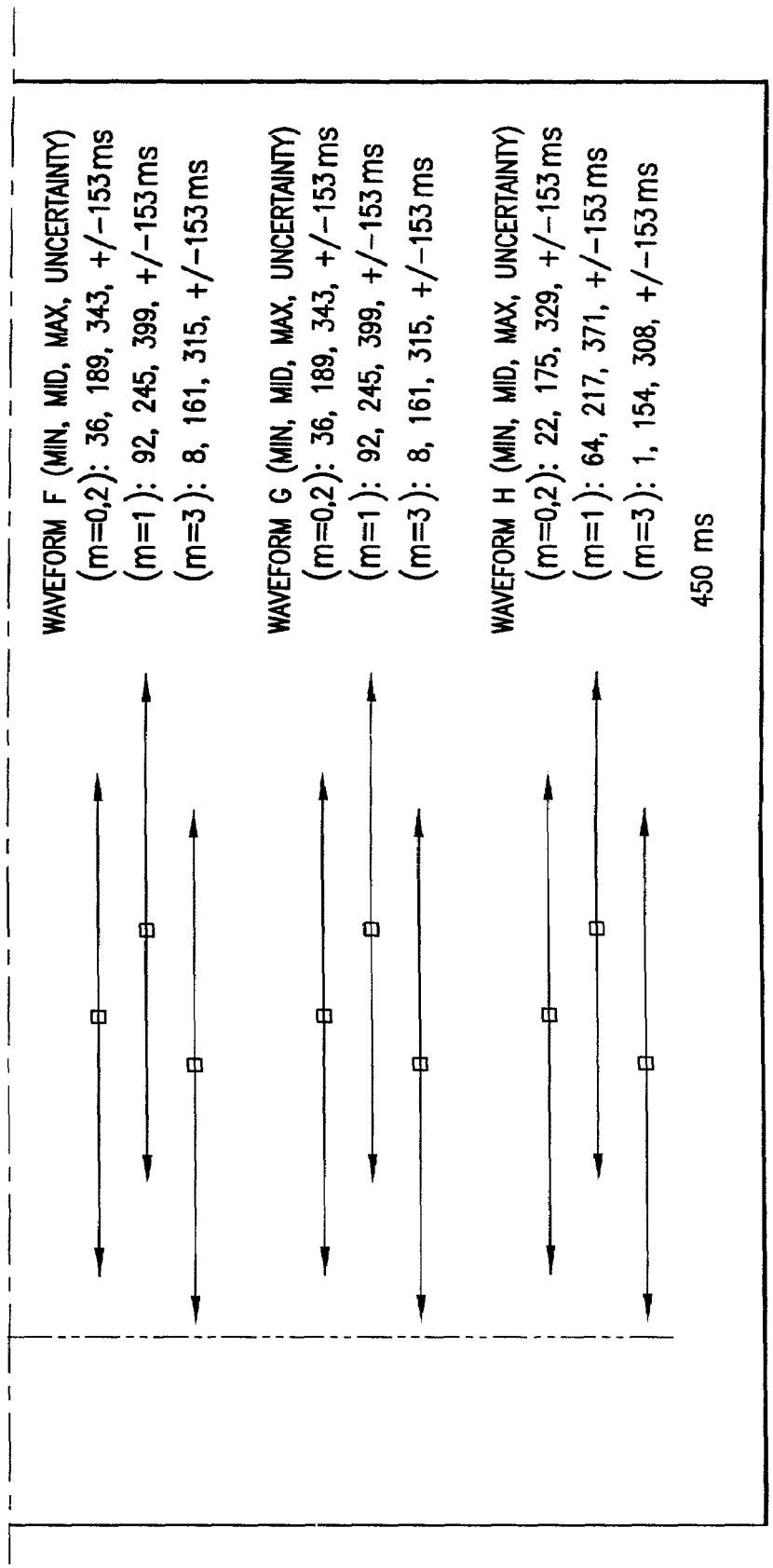

TSI time delays are graphically summarized in FIG. 7. Preferably, code alignment (zero PN code phase shift) exists within the uncertainty being searched, indicated by the double-headed lines (↔) of FIG. 7. In alternate embodiments, −6 dB (representative of full correlation) correlations may exist at $\pm n \times L_{XY}$ (integer multiples XY lengths) from zero PN code phase shift and may be difficult to distinguish from zero phase shift correlations. Consequently, XY epochs from zero PN code phase shift are preferably avoided during acquisition in order to avoid false acquisition. Still referring to FIG. 7 there are shown example waveforms and their associated uncertainty ranges. It will be appreciated that only the XY epochs for waveform C are shown in FIG. 7. The XY epochs for the other waveforms occur off the FIG. 7 scale and are not necessary here for purposes of explanation.

As shown in FIG. 7, a general solution for most of the waveforms may be derived by including the shortest delay, which is rounded down to zero, and the longest delay, which is rounded up to 450 ms. The general solution PN code advance is then 225 ms (450÷2), and the general solution PN code uncertainty to be searched (center to edge) is 225 ms.

General Solution to Data-aided YZ PN Code Advance and Uncertainty:

$$PN \text{ Code Advance (or uncertainty)} = \quad \text{Equation 14}$$

$$225 \, m\sec \times \frac{\text{samp\_rate}}{SCPC} \times \frac{3 \times 5^7}{2^{20}}$$

In alternate embodiments where waveform uncertainty ranges approach the XY epoch it may be desirable to have more than one general solution or a solution for each uncertainty range. For example, if Waveform C (FIG. 7) were included in the general solution example above, use of the shortest delay by Waveform C would take its modified uncertainty range closer to its nearest XY epoch, and use of the longest delay caused by Waveform C may add too much overhead to the general solution. Thus, for Waveform C, the 225 ms of Equation 14 should be substituted with 297 ms and 191 ms for PN code advance and uncertainty, respectively.

Figures 8, 8A:
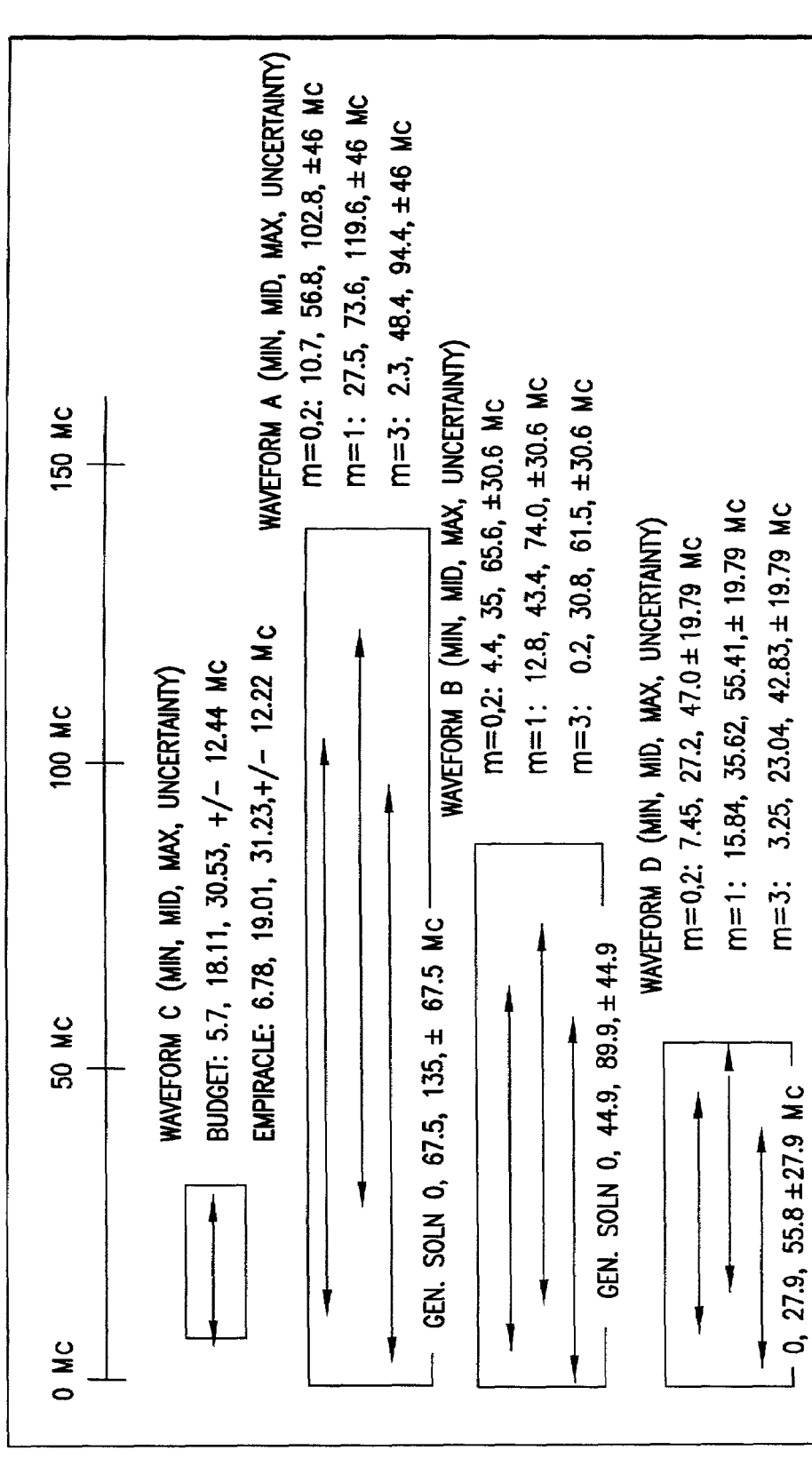
FIG. 8 is a chip graph showing one grouping arrangement of the waveform uncertainties shown in FIG. 7 in order to search groups according to chip uncertainty.
Figure 8B:
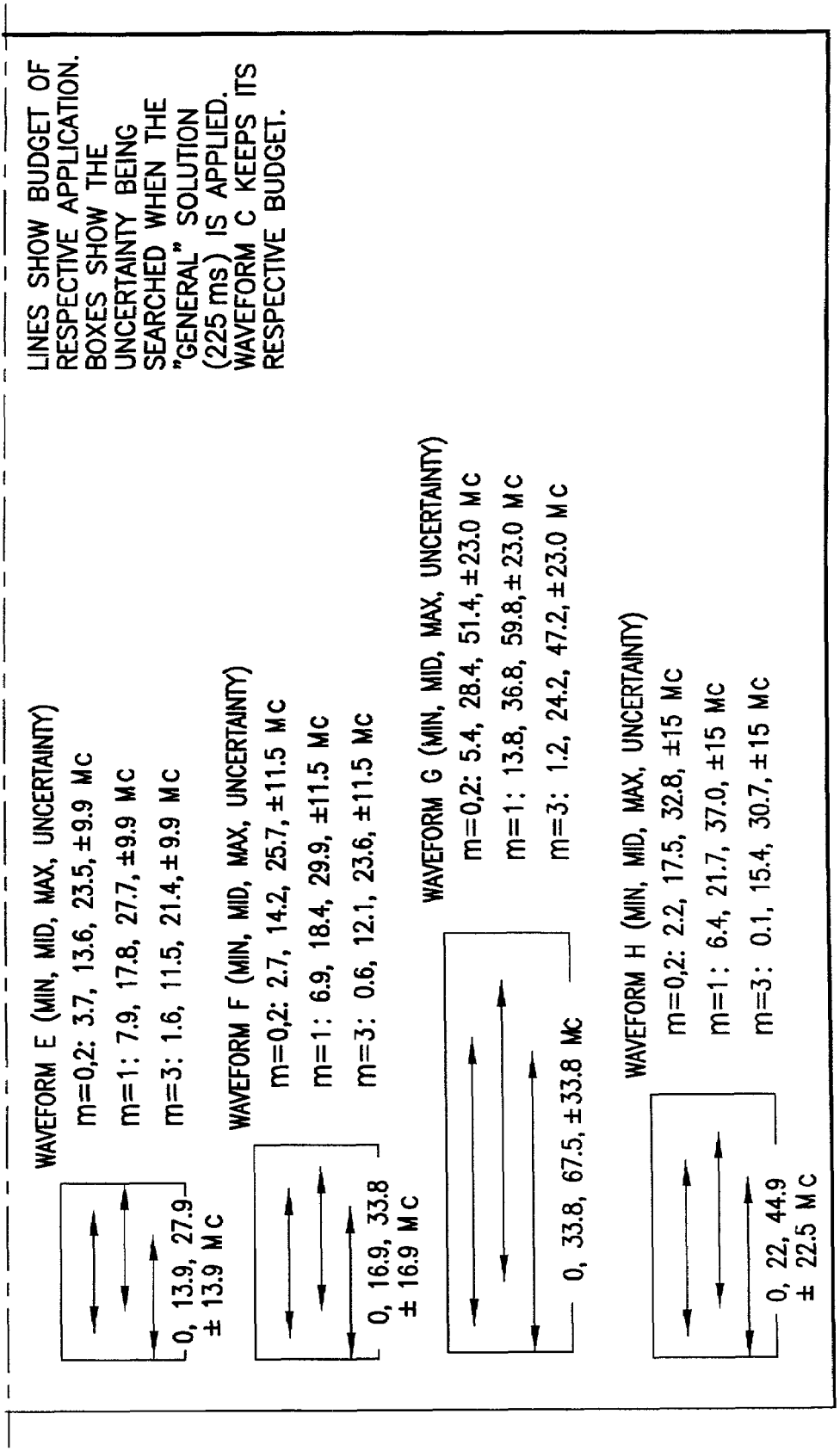

Referring also to FIG. 8, there is shown a graphical summary, in terms of chips, the effect of using a general solution to advance and search an uncertainty. It can be seen that a general solution searches more of a PN code sequence than uncertainty budgets indicate are necessary. It will be appreciated that the advantage of a general solution is the resulting system and hardware simplification.

Returning to FIG. 4, the local platform's LCP 1B21 has collected TSI and delta phase information from the opposing (transmitting) platform, step 47. Similarly, the local platform's LCP 1B21 has collected TSI and delta phase information from its own MDC 1B22 and has used that data to calculate the composite PN code phase of its locally generated PN code, step 404, the one being compared to the received signal.

The local platform's LCP 1B21 subtracts its composite code phase from the opposing platform's composite code phase (Equation 10). As noted above, this difference does not take into account the uncertainties of the data used to make the calculation.

Because the opposing platform's TSI data represents information that may be delayed (see FIG. 6), the opposing platform's composite code phase may be more progressed (advanced) in phase than reported by its TSI. Based on the example shown above, the local platform should advance its composite code phase by as little as 0 seconds or as much as 450 milliseconds.

In accordance with the teachings of the present invention the local LCP 1B21 moves its composite PN code to the same composite PN code phase position as reported by opposing platform (the difference determined by Equation 10). The local LCP 1B21 advances its local copy of its correlator (receiver) PN code if the [Equation 10] difference is positive and slips it by the difference if the difference is negative. In addition, the local LCP 1B21 adds the maximum advance needed to compensate for worst-case TSI latency combinations. Thus, twice the value of Equation 14 may be added to the value of Equation 10 to equal the number of chips to be slipped (if the result is negative) or advanced (if the result is positive) that places, steps 48–49, the local platform's PN code at the most-advanced-phase boundary of the uncertainty to be searched. Only the X code of local platform's PN code is zero-phase aligned with the PN code received from the opposing platform. (It is due to the partial correlation of this alignment that the local platform is able to recover data from the received data stream.) In order for the local LCP to maintain this X-code, zero-phase alignment, the local platform preferably changes its PN code phase (move its PN code) by a modulo-X-length number of chips. The LCP 1B21 commands the MDC 1B22 to move the given number of chips (Equation 10 plus Equation 14), and the MDC 1B22 modifies this number, using Equation 11, forcing the number of chips to move to be an exact X-code-length number of chips, step 401.

The MDC 1B22 moves the entire PN code to the most-advanced-phase position of the uncertainty to be searched, step 49. In alternate embodiments more than one correlator may be used and the PN code may be moved to a position other than the most advanced position. For example, in an embodiment having two correlators, one correlator starts at the center and slips to the end of the uncertainty, while the $2^{nd}$ correlator starts at the middle-plus-advance-by-½-the uncertainty and slips/searches to the center. Returning to the present example, the uncertainty to be searched, using the results of the example's uncertainty, is 450 milliseconds long. If the chipping rate were 325 Mc/s and the X-code length were $2^{13}$, 8192 chips, the uncertainty to be searched would be 146,251,776 chips (450 ms×325 Mc/s+1776 [for modulo X length]). There are 17,854 X epochs within this uncertainty. The MDC, in effect, slips its composite PN code in X-length increments, testing for correlation at the Y, $Z_1$, and $Z_2$ component code phases at each of these X-epoch positions, testing for full correlation (composite, zero phase alignment), step 402. It will be appreciated, in terms of the example shown, that rapid acquisition is achieved by searching the uncertainty of 146 Mchips with only 17.8 K tests. Stated differently, only 17,854 phase positions are tested in an uncertainty of 146,000,000 chips.

It is appreciated that the PN-decade codes described herein provide unambiguous PN code phase throughout calendar decades and allows DSSS communication systems to join or rejoin a particular communication network operating with a PN-decade code. In a preferred embodiment, the DSSS communication systems operating with PN-decade codes are collocated with naval platforms (ships, aircraft, etc) and advantageously allow the platforms to join and communicate with a fleet at any time, with unambiguous time and unambiguous PN code phase alignment.

It will also be appreciated that the advantageous use of four component codes allows for high chipping rates and pseudo-noise (PN) code lengths that repeat themselves at intervals that exceed calendar decades. The method obviates repeatable schedules of PN code phase versus time within an hour or time of day or time of week, et cetera.

It is also appreciated that platform communication systems operating with the PN-decade codes described herein can arrive at an already assembled fleet of platforms and resolve spatial uncertainties without time ambiguities or calendar ambiguities. Advantageously, a fleet, or components of the fleet, may assemble at any desired time without time or calendar ambiguities and without having to reset all fleet participants to a common clock reference; and no ambiguous register rollovers exist.

It should be understood that the foregoing description is only illustrative of the invention. Various alternatives and modifications can be devised by those skilled in the art without departing from the invention. For example, in alternate embodiments, any suitable method (FIG. 5, item 58) for combining component codes may be used; MAJ combined codes may be used in place of MAND combined codes. MAJ for a 4-component-code sequence:

$$XYZ_1Z_2:MAJ=(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$$

In addition, in alternate embodiments any suitable number of component codes may be used. Referring to FIG. 5 there is shown one such possible alternative embodiment. It will be appreciated that items 51–58 can be individual components or an integrated circuit (IC), item 59. It will be further appreciated that the IC may be a field programmable gate array (FPGA) or an application specific IC (ASIC), which the operation of either may be defined by a suitable programming language such as a Very High Speed Integrated Circuit (VHSIC) Hardware Description (VHDL) Language file. Accordingly, the present invention is intended to embrace all such alternatives, modifications and variances that tall within the scope of the appended claims.

What is claimed is:

1. A system for generating and acquiring pseudo-noise (PN) spread signals, the system comprising:
   a transmitter, wherein the transmitter comprises:
      a first clock generator,
      at least three first pseudo-noise (PN) component code generators coupled to the first clock generator;
      a logic combiner coupled to the at least three first PN component code generators, the logic combiner adapted to generate a composite PN code;
      a first N-bit counter coupled to the first clock generator;
      a second clock generator, wherein the second clock is adapted to synchronize with the first clock generator;
      a second M-bit counter coupled to the second clock generator;
   a receiver, the receiver adapted to receive signals from the transmitter, comprising:
      a link control processor;
      a modulator/demodulator controller coupled to the link control processor;
      a first receiver clock generator;
      at least three first receiver pseudo-noise (PN) component code generators coupled to the first receiver clock generator;
      a despreader coupled to one of the at least three first receiver PN component code generators;
      a receiver logic combiner coupled to the at least three first receiver PN component code generators, the receiver logic combiner adapted to generate a composite PN code;
      a first receiver N-bit counter coupled to the first receiver clock generator;
      a second receiver clock generator, wherein the second receiver clock generator is adapted to synchronize with the first receiver clock; and
      a second receiver M-bit counter coupled to the second receiver clock generator.

2. A system as in claim 1 wherein the first clock generator comprises a first direct digital synthesizer.

3. A system as in claim 1 wherein the logic combiner comprises a MAND logic combiner that logically XOR combines an output of one of the PN code generators with a logical AND result of at least two other of the PN code generators.

4. A system as in claim 1 wherein the logic combiner comprises a MAJ logic combiner that logically XOR combines all logical AND combinations of unique pairs of PN code generator outputs.

5. A system as in claim 1 wherein the at least three first PN component code generators comprise four first PN component code generators.

6. A system as in claim 1 wherein the at least three first receiver PN component code generators comprise four first receiver PN component code generators.

7. A system as in claim 1 wherein the second clock generator comprises a crystal reference oscillator.

8. A system as in claim 1 wherein the second receiver clock generator comprises a second crystal reference oscillator.

9. A system as in claim 1 wherein the second M-bit counter coupled to the second clock generator comprises at least a 40-bit counter.

10. A system as in claim 1 wherein the second receiver M-bit counter comprises at least a 40-bit counter.

11. A method for generating and acquiring pseudo-noise (PN) composite spread signals, the method comprising the steps of:
    at a transmitter:
       providing a PN clock source, the PN clock source having a predetermined cycle rate;
       using the PN clock source to generate at least three transmit PN component codes, wherein the step of generating the at least three transmit PN component codes further comprises the steps of:
          initializing a first counter, wherein the first counter is adapted to count the PN clock source cycles;
       logically combining the at least three transmit PN component codes to produce a transmit PN composite code;
       providing an oscillatory reference source, the oscillatory reference source having predetermined cycles;
       initializing a second counter, wherein the second counter is adapted to count the cycles of the oscillatory reference source;
       determining a transmitter delta phase in accordance with counts from the first counter and the second counter;
       transmit PN composite coding the transmitter delta phase and a cycle count of the second counter;
       transmitting the transmit PN composite coded transmitter delta phase and the PN composite coded cycle count of the second counter at a predetermined rate;
    at a receiver:
       receiving the transmitted signal;
       partially correlating the received signal; and
       determining a receive PN composite code slip for chip aligning a receive PN composite code with the transmit PN composite code.

12. A method as in claim 11 wherein the step of providing the PN clock source comprises the step of providing a direct digital synthesizer.

13. A method as in claim 11 wherein the step of generating the at least three transmit PN component codes comprises the step of generating one of the at least three transmit PN component codes with predetermined auto-correlation properties.

14. A method as in claim 11 wherein the step of generating at least three transmit PN component codes comprises the step of generating four transmit PN component codes.

15. A method as in claim 14 wherein the step of combining the four transmit PN component codes comprises logically combining the four transmit PN component codes X, Y, $Z_1$ and $Z_2$ according to:

$$(X \oplus (Y \cdot (Z_1 \oplus Z_2))).$$

16. A method as in claim 14 wherein the step of combining the four transmit PN component codes comprises logically combining the four transmit PN component codes X, Y, $Z_1$ $Z_2$ according to:

$$(X \cdot Y) \oplus (X \cdot Z_1) \oplus (X \cdot Z_2) \oplus (Y \cdot Z_1) \oplus (Y \cdot Z_2) \oplus (Z_1 \cdot Z_2).$$

17. A method as in claim 11 wherein the step of providing the oscillatory reference source comprises providing a crystal oscillatory reference source.

18. A method as in claim 17 wherein the step of providing the crystal oscillator reference source comprises providing a 10 MHz reference source.

19. A method as in claim 11 wherein the step of providing the oscillatory reference source comprises providing an atomic reference source.

20. A method as in claim 11 wherein the step of initializing the second counter comprises initializing the second counter at substantially the same time as initializing the first counter.

21. A method as in claim 11 wherein the step of partially correlating the received signal comprises:
providing one of at least three receive PN component codes; and
correlating the one of the at least three receive PN component codes with the received signal.

22. A method as in claim 21 wherein the step of determining the receive PN composite code slip for chip aligning further comprises:
providing a PN receiver clock source, the PN receiver clock source having a predetermined cycle rate;
using the PN receiver clock source to generate at least three receive PN component codes, wherein the step of generating the at least three receive PN component codes comprises the steps of:
initializing a receiver first counter, wherein the receiver first counter is adapted to count the PN receiver clock source cycles;
logically combining the at least three receive PN component codes to produce the receive PN composite code;
providing a receiver oscillatory reference source, the receiver oscillatory reference source having predetermined cycles;
initializing a receiver second counter, wherein the receiver second counter is adapted to count the cycles of the receiver oscillatory reference source;
determining a receiver delta phase in accordance with counts from the receiver first counter and the receiver second counter;
determining the transmitter delta phase by partially correlating the received signal against at least one of the receive PN component codes;
determining a latency associated with the receiver second counter; and
substantially aligning the receive PN composite code with the transmit PN composite code in accordance with a first function, the first function comprising the parameters: the transmitter delta phase, the cycle count of the transmitter second counter, the receiver delta phase, the cycle count of the receiver second counter, and the latency.

23. A method as in claim 22 wherein the step of logically combining the at least three receive PN component codes to produce the receive PN composite code comprises logically combining four receive PN component codes X, Y, $Z_1$ and $Z_2$ according to:

$(X \oplus (Y \cdot (Z_1 \oplus Z_2)))$.

24. A method as in claim 22 wherein the step of logically combining the at least three receive PN component codes to produce the PN composite code comprises logically combining four receive PN component codes X, Y, $Z_1$ and $Z_2$ according to:

$(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$.

25. A method as in claim 22 wherein the step of providing the receiver oscillatory reference source comprises providing a crystal oscillatory source.

26. A method as in claim 22 wherein the step of providing the receiver oscillatory reference source comprises providing a second atomic reference source.

27. A method as in claim 22 wherein the step of substantially aligning the receive PN composite code with the transmit PN composite code in accordance with the first function comprises:
determining an uncertainty chip range associated with the latency associated with the receiver second counter;
moving the phase of the at least three receive PN component codes, other than the at least one receive PN code used for partial correlation, to a predetermined phase within the determined uncertainty chip range; and
searching for full correlation over the uncertainty chip range in units of a number of chips associated with the one receive PN component code used for partial correlation.

28. A system for generating (PN) spread signals, the system comprising:
a first clock generator;
at least three first pseudo-noise (PN) component code generators coupled to the first clock generator, wherein the first clock generator generates clock signals to drive the PN component code generators;
a logic combiner coupled to the outputs of the at least three first PN component code generators, the logic combiner adapted to generate a composite PN code;
a first N-bit counter coupled to the first clock generator, wherein the first N-bit counter counts the clock signals generated by the first clock generator;
a second clock generator, wherein the second clock generator is adapted to synchronize with the first clock generator; and
a second M-bit counter coupled to the second clock generator, wherein the second M-bit counter counts time since initialization of the second clock generator.

29. A system as in claim 28 wherein the first clock generator comprises a first direct digital synthesizer.

30. A system as in claim 28 wherein the logic combiner comprises a MAND logic combiner that logically XOR combines an output of one of the PN code generators with a logical AND result of at least two other of the PN code generators.

31. A system as in claim 28 wherein the logic combiner comprises a MAJ logic combiner that logically XOR combines all logical AND combinations of unique pairs of PN code generator outputs.

32. A system as in claim 28 wherein the at least three first PN component code generators comprise four first PN component code generators.

33. An integrated circuit (IC) comprising,
a first clock signal generator for generating first clock signals;
at least three first pseudo-noise (PN) component code generators coupled to the first clock signal generator;
a logic combiner coupled to the outputs of the at least three first PN component code generators, the logic combiner adapted to generate a composite PN code;
a first N-bit counter coupled to the first clock signal generator, wherein the first N-bit counter is adapted to count the first clock signals;

a second clock generator for generating second clock signals, wherein generating the second clock signals is synchronized with generating the first clock signals; and a second M-bit counter coupled to the second clock generator, wherein the second M-bit counter is adapted to count time since initialization of synchronization of generating the second clock signals and generating the first clock signals.

34. An IC as in claim 33 wherein the first clock signal generator comprises a first clock signal input pin.

35. An IC as in claim 34 wherein the first clock signal generator comprises the first clock signal input pin coupled to a first direct digital synthesizer.

36. An IC as in claim 33 wherein the second clock generator comprises a second clock signal input pin.

37. An IC as in claim 36 wherein the second clock generator comprises the second clock signal input pin coupled to a second direct digital synthesizer.

38. An IC as in claim 36 wherein the second clock generator comprises the second clock signal input pin coupled to an atomic clock.

39. An IC as in claim 36 wherein the second clock generator comprises the second clock signal input pin coupled to a crystal oscillator.

40. An IC as in claim 33 wherein the first clock generator comprises an onboard first direct digital synthesizer.

41. An IC as in claim 33 wherein the second clock generator comprises an onboard second direct digital synthesizer.

42. An IC as in claim 33 wherein the second clock generator comprises an onboard first crystal oscillator.

43. An IC as in claim 33 wherein the IC comprises an Application Specific IC (ASIC).

44. An IC as in claim 33 wherein the IC comprises a field programmable gate array (FPGA).

45. A program storage device readable by a machine, tangibly embodying a program of instructions executable by the machine to perform method steps for generating and acquiring pseudo-noise (PN) composite spread signals, the method comprising the steps of:

at a transmitter:
providing a PN clock source, the PN clock source having a predetermined cycle rate;
using the PN clock source to generate at least three PN component codes, wherein the step of generating the at least three PN component codes further comprises the steps of:
initializing a first counter, wherein the first counter is adapted to count the PN clock source cycles;
logically combining the at least three PN component codes to produce a PN composite code;
providing an oscillatory reference source, the oscillatory reference source having predetermined cycles;
initializing a second counter, wherein the second counter is adapted to count the cycles of the oscillatory reference source;
determining a transmitter delta phase in accordance with counts from the first counter and the second counter;
PN composite coding the transmitter delta phase and the second counter count; transmitting the PN composite coded transmitter delta phase and the PN composite second counter count at a predetermined rate;

at a receiver:
receiving the transmitted signal;
partially correlating the received signal; and
determining a PN composite code slip for chip aligning a receiver PN composite code with the transmitter PN composite code.

46. A program storage device as in claim 45 wherein the program of instructions comprise at least one Very High Speed Integrated Circuit (VHSIC) Hardware Description (VHDL) Language file.

* * * * *